(12) United States Patent
Chou (10) Patent No.: US 8,999,496 B2
(45) Date of Patent: Apr. 7, 2015

(54) SUBSTRATE STRUCTURE AND COLOR FILTER (75) Inventor: Ching-Yu Chou, Hsinchu (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 1225 days.

(21) Appl. No.: 11/566,816

(22) Filed: Dec. 5, 2006

(65) Prior Publication Data

US 2007/0134472 A1    Jun. 14, 2007

(30) Foreign Application Priority Data

Dec. 9, 2005 (TW) ............................... 94143564 A
Dec. 23, 2005 (TW) ............................... 94146350 A (51) Int. Cl.
B32B 3/00 (2006.01)
G02B 5/20 (2006.01)

(52) U.S. Cl.
CPC .................................. G02B 5/201 (2013.01)

(58) Field of Classification Search
USPC ............. 347/55, 115, 20, 107; 101/467, 454; 430/302, 7; 428/195.1
See application file for complete search history.

(56) References Cited

U.S. PATENT DOCUMENTS

| 2,614,352 | A | * | 10/1952 | MacHarg | 40/552 |
| 5,561,011 | A | * | 10/1996 | Miyazaki et al. | 430/7 |
| 5,637,380 | A | * | 6/1997 | Kaneko et al. | 428/204 |
| 6,399,257 | B1 | * | 6/2002 | Shirota et al. | 430/7 |
| 6,468,702 | B1 | * | 10/2002 | Yi et al. | 430/7 |
| 6,522,377 | B2 | * | 2/2003 | Kim et al. | 349/114 |
| 6,927,819 | B2 | * | 8/2005 | Jeong | 349/114 |

FOREIGN PATENT DOCUMENTS

| CN | 1129024 | 11/2003 |
| CN | 021001000.5 | 4/2005 |

* cited by examiner

Primary Examiner — Angela Ortiz
Assistant Examiner — Klee S Simmons
(74) Attorney, Agent, or Firm — Novak Druce Connolly Bove + Quigg LLP (57) ABSTRACT An exemplary method for manufacturing a substrate structure includes steps of: providing a substrate; forming a plurality of isolated protrusions on the substrate; depositing ink onto the protrusions; and solidifying the ink to form a plurality of ink layers on the respective protrusions. This method can create ink layers with uniform thickness. A substrate structure having ink layers is also included.

16 Claims, 9 Drawing Sheets

SUBSTRATE STRUCTURE AND COLOR FILTER

BACKGROUND

1. Technical Field

The present invention relates to substrate structures and methods for manufacturing the same and more specifically to a substrate structure having a plurality of ink layers that have a uniform thickness and a method for manufacturing the same.

2. Description of Related Art

At present, methods for manufacturing a substrate structure having ink layers include photolithographic methods and ink-jet methods.

A photolithographic method is described as below: applying a photoresist layer onto a substrate; exposing the photoresist layer using a photo mask with a predetermined pattern and developing the exposed photoresist layer to form a predetermined patterned thin-film layer. However, a complex process is needed in the photolithographic method and utilization ratio of the photoresist material is low thus increasing manufacturing costs.

An ink-jet method generally uses an ink-jet device for depositing ink into a predetermined position on a substrate. Ink layers are formed after solidifying the ink.

In a conventional ink-jet method, a plurality of banks are formed on the substrate and a plurality of accommodating spaces are defined by the banks and the substrate. Ink can be deposited into the accommodating spaces and solidified to form the ink layers. However, thickness of the banks is greater than that of the fluid ink in the accommodating spaces. When the ink is solidified, the thickness of the banks is greater than that of the ink layers. The ink may creep onto the banks due to the surface energy difference between the banks and the ink, therefore, the thickness of the ink layer near the banks is greater than that of the ink layer far away from the banks. Thus, the ink layers have uneven thickness.

What is needed, therefore, is a substrate structure having ink layers and a method for manufacturing the same with a uniform thickness.

SUMMARY

In a first embodiment, a substrate structure includes a substrate, a plurality of isolated protrusions on the substrate, and a plurality of ink layers formed on the respective protrusions.

In a second embodiment, a method for manufacturing a substrate structure includes the steps of: providing a substrate; forming a plurality of isolated protrusions on the substrate; depositing ink onto the protrusions; and solidifying the ink to form a plurality of ink layers on the respective protrusions.

In a third embodiment, a method for manufacturing a substrate structure includes the steps of: providing a substrate having a plurality of separate integral protrusions; depositing ink onto the integral protrusions; and solidifying the ink to form a plurality of ink layers on the respective protrusions.

Other advantages and novel features will become more apparent from the following detailed description of the present substrate structure and method for manufacturing the same when taken in conjunction with the accompanying drawings.

BRIEF DESCRIPTION OF THE DRAWINGS

Many aspects of the substrate structure and method for manufacturing the same can be better understood with reference to the following drawings. The components in the drawings are not necessarily drawn to scale, the emphasis instead being placed upon clearly illustrating the principles of the present substrate structure and method for manufacturing the same. Moreover in the drawings like reference numerals designate corresponding parts throughout the several views.

DETAILED DESCRIPTION OF PREFERRED EMBODIMENTS

Reference will now be made to the drawings to describe the preferred embodiments of the present substrate structure and method for manufacturing the same in detail.

Figure 1:
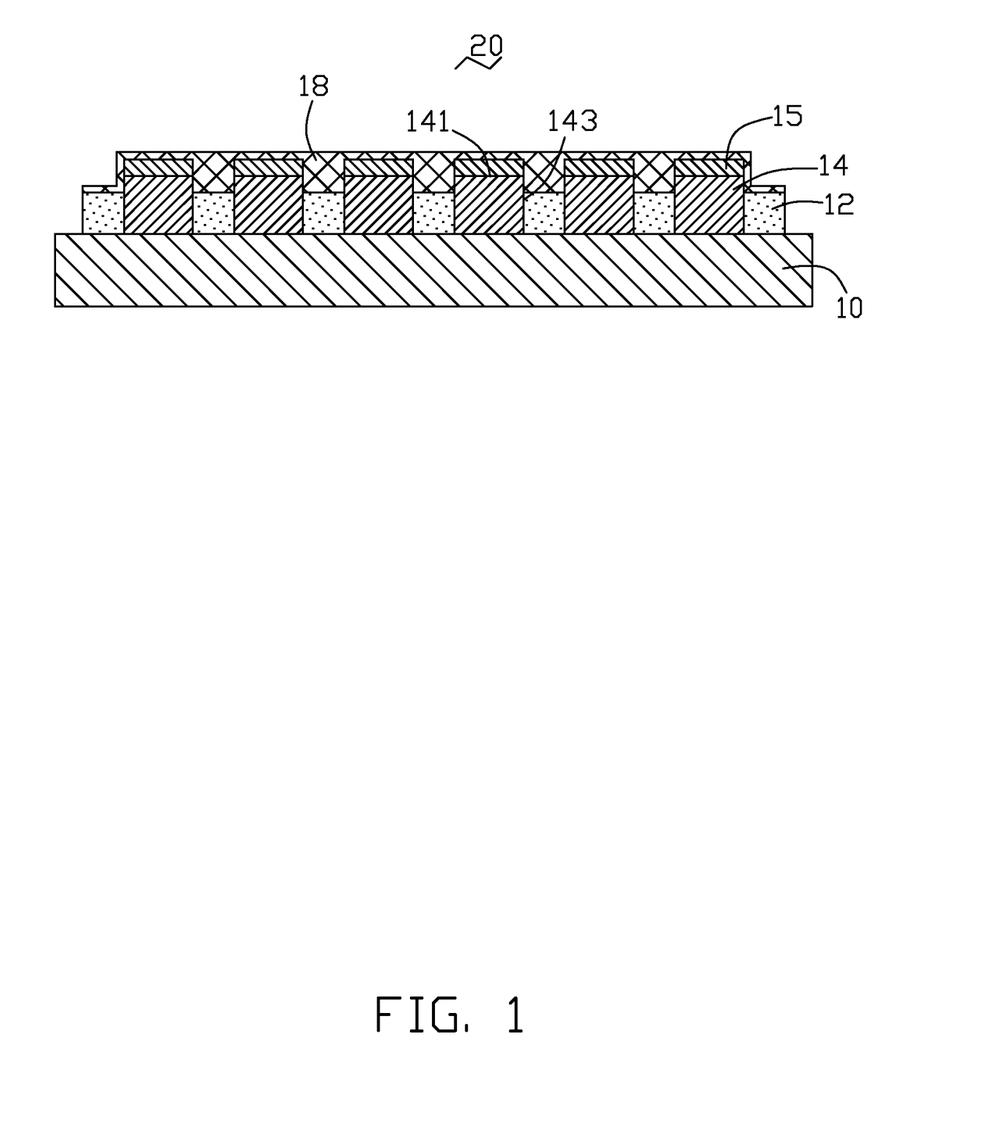
FIG. 1 is a schematic, cross-sectional view of a substrate structure having a plurality of ink layers in accordance with a first embodiment of the present substrate structure.

Referring to FIG. 1, a substrate structure 20 in accordance with a first embodiment is shown. The substrate structure 20 includes a substrate 10, a black matrix 12, a plurality of isolated protrusions 14, a plurality of ink layers 15, and a protective layer 18.

A material of the substrate 10 can be glass, silicon wafer, metal, plastic, etc. In this embodiment, the substrate 10 is made of glass. The protrusions 14 should be made of transparent material such as, for example, transparent resin.

Optionally, between each of the protrusions 14, the black matrix 12 is arranged. Each protrusion 14 includes a top surface 141 and a side surface 143. The side surfaces 143 of adjacent protrusions 14 are spaced. Normally, a thickness of the protrusion 14 is greater than that of the black matrix 12. Thus, the top surfaces 143 of adjacent protrusions 14 are spaced. The ink layer 15 is arranged on the protrusion 14. The ink layers 15 can include red layers, green layers, and blue layers. Also, optionally, a protective layer 18 covers the black matrix 12 and the ink layers 15, therefore, the substrate structure 20 has characteristics of good oxidation resistance, anti-pollution, moisture resistance, and flatness. The protective layer 18 is partly received between the sidewalls 143 of adjacent protrusions 14 and cover on the black matrix 12.

Otherwise, the protrusions 14 can be formed integrally with the substrate 10 using injection molding.

In a second embodiment, a method for manufacturing the substrate structure 20 includes the steps of: providing a substrate; forming a black matrix on the substrate, the black matrix defining a plurality of spaces; forming a plurality of isolated protrusions, each of the protrusions being arranged in each of the spaces, the thickness of the protrusion being greater than that of the black matrix; depositing ink onto the protrusions; solidifying the ink to form ink layers on the respective protrusions; and forming a protective layer on the black matrix and the ink layers.

With references to FIGS. 1 to 8, the method for manufacturing the substrate structure 20 with the second embodiment is described in more detail.

Figure 2:
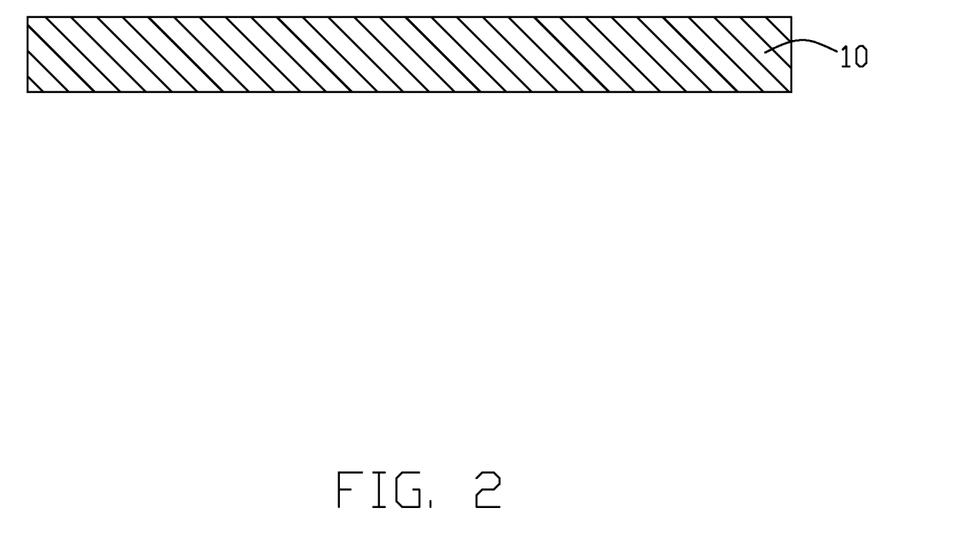
FIG. 2 is a schematic, cross-sectional view of one stage of a method for manufacturing a substrate structure having a plurality of ink layers in accordance with a second embodiment of the present substrate structure.

Referring to FIG. 2, a substrate 10 is provided. The substrate 10 can be made of a material selected from the group consisting of glass, silicon wafer, metal, and plastic. The substrate 10 can have a thickness in the approximate range from 0.5 millimeters to 1.1 millimeters, the area of the substrate 10 can be selected to conform to the requirements of the desired product.

A black matrix 12 (shown in FIG. 4) can be formed on the substrate 10. Different methods for manufacturing the black matrix 12 can be used depending on the material that the black matrix 12 are made of.

Figure 3:
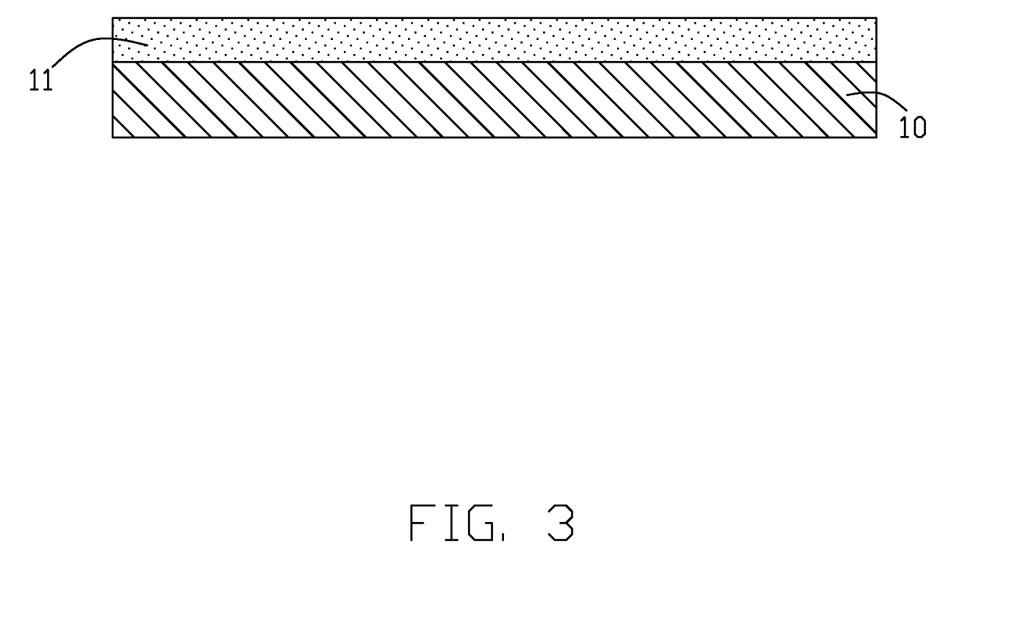
FIG. 3 is similar to FIG. 2, but showing a first method for manufacturing a black matrix.
Figure 4:
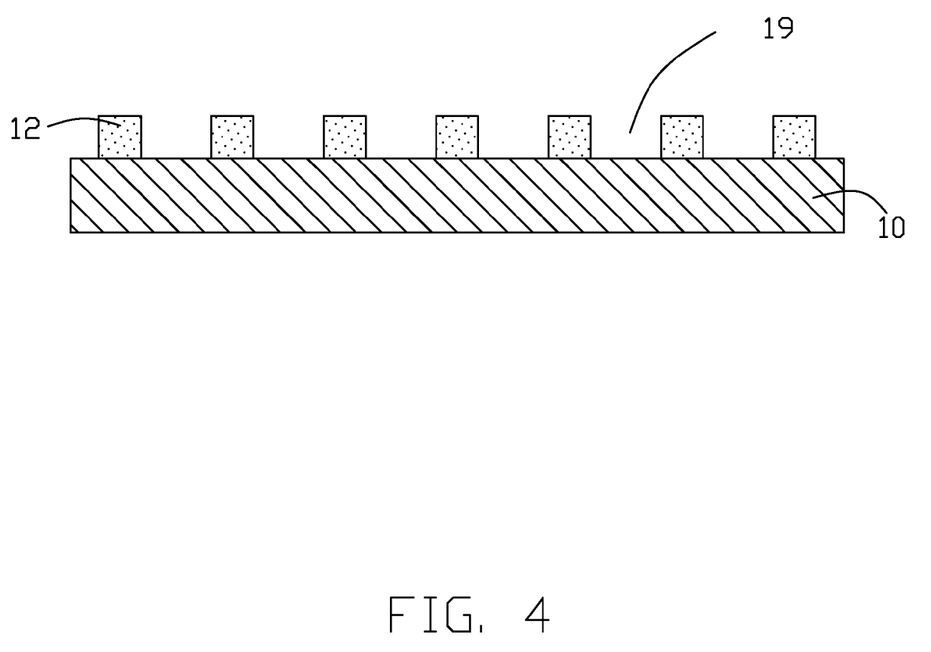
FIG. 4 is similar to FIG. 3, but showing the black matrix formed on the substrate shown in FIG. 3.

Referring to FIGS. 3 and 4, in these steps a first method for manufacturing the black matrix 12 is shown. The material of the black matrix 12 used in this method can be photosensitive resin. A method selected from the group consisting of slit coating, spin coating, slit and spin, and dry film lamination can be used to form a photosensitive layer 11 on the substrate 10. The photosensitive layer 11 is then exposed to a light source through a photo mask with a predetermined pattern and is then developed (i.e., the exposed sections are chemically treated). As a result unwanted portions of the photosensitive layer 11 are removed, a plurality of spaces 1 9 and the black matrix 12 are formed.

Figure 5:
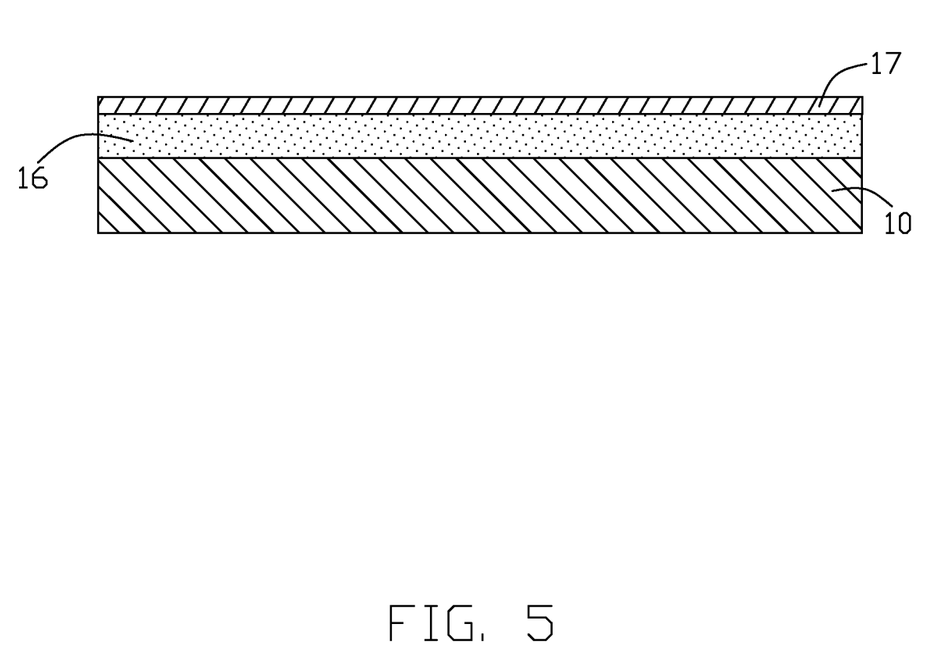
FIG. 5 is similar to FIG. 2, but showing a second method for manufacturing a black matrix.

Referring to FIG. 5, in this step a second method for manufacturing the black matrix 12 is shown. The material of the black matrix 12 is not photosensitive, being selected from the group consisting of chromium, chrome oxide, and compounds of chromium, chromium nitride, and chrome oxide. A photoresist layer is necessary because the material used is not photosensitive. A non-photosensitive layer 16 is applied onto the substrate 10 using a vacuum sputtering method or an evaporating method, and then a photoresist layer 17 is formed on the non-photosensitive layer 16. Unwanted portions of the photoresist layer 17 are removed and the non-photosensitive layer 16 is exposed. The exposed portions of the non-photosensitive layer 16 and the remaining portions of the photoresist layer 17 are removed, thus forming the black matrix 12.

Figure 6:
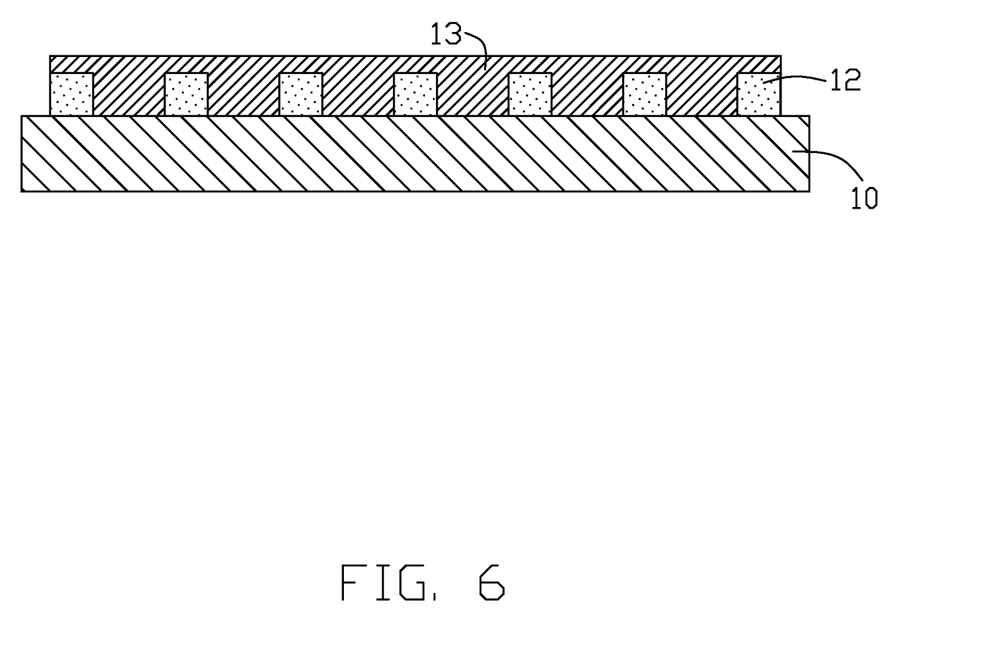
FIG. 6 is similar to FIG. 4, but showing a coating layer formed on the black matrix.

Referring to FIG. 6, in this step a coating layer 13 is formed on the black matrix 12 and in the spaces 19. The thickness of the coating layer 13 is greater than that of the black matrix 12.

Different methods for manufacturing the coating layer 13 can be used depending on the material that the coating layer 13 is made of. The material of the coating layer 13 can be composed of a photosensitive resin such as, for example, acrylate photosensitive resin, modified acrylate-type photosensitive resin, polyimide, silicone-type photosensitive resin, and fluorine-type photosensitive resin, and then the coating layer 13 can be applied using at least one method selected from the group consisting of slit coating, spin coating, slit and spin coating, and dry film lamination. The material of the coating layer 13 can be composed of a material which is not photosensitive such as, for example, indium tin oxide, indium zinc oxide, zinc oxide, cadmium tin oxide, or aluminum, and the coating layer 13 can be applied using a vacuum sputtering or an evaporating method.

Figure 7:
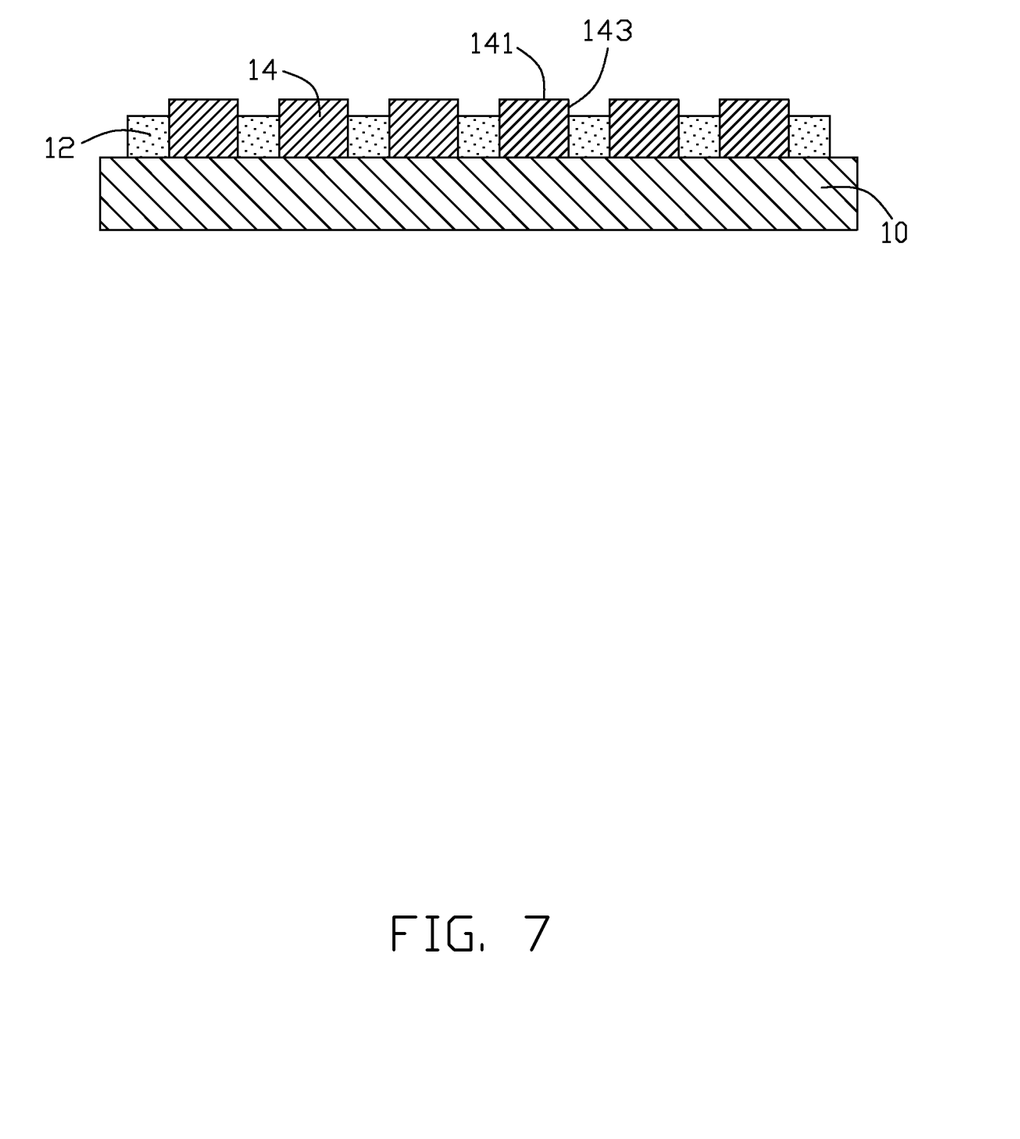
FIG. 7 is similar to FIG. 6, but showing a plurality of isolated protrusions formed on the substrate.

Referring to FIG. 7, in this step portions of the coating layer 13 on the black matrix 12 are removed and a plurality of isolated protrusions 14 are achieved. Each protrusion 14 includes a top surface 141 and a side surface 143. The side surfaces 143 of adjacent protrusions 14 are spaced. The thickness of the protrusion 14 is greater than that of the black matrix 12. Thus, the top surfaces 143 of adjacent protrusions 14 are spaced.

Figure 8:
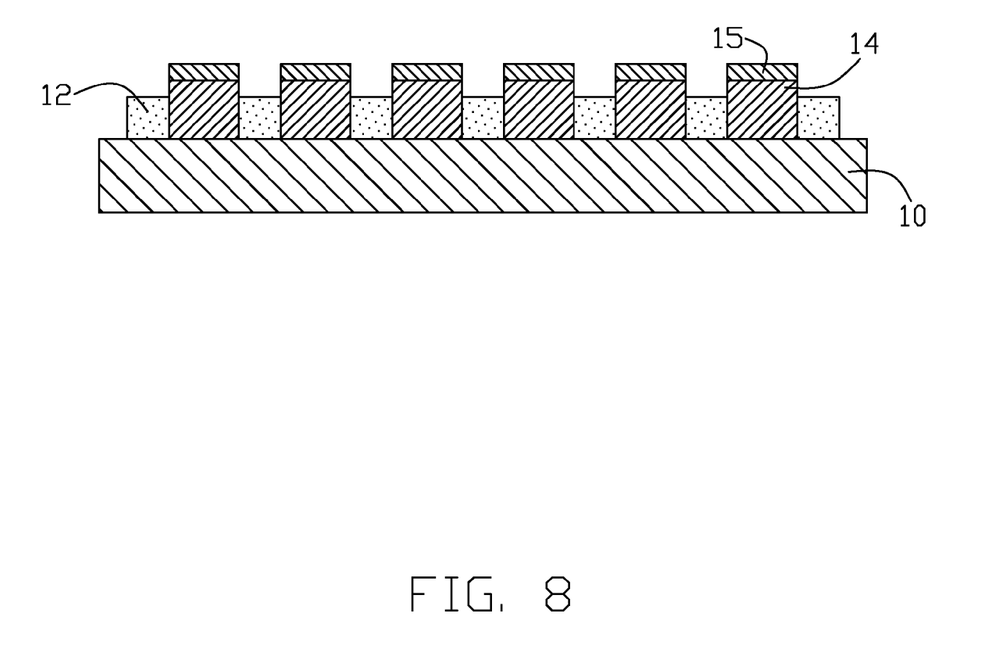
FIG. 8 is similar to FIG. 7, but showing ink layers formed on the respective protrusions.

Referring to FIG. 8, in this step ink is injected onto the protrusions 14 by an ink-jet device and is then solidified. The ink-jet device can be at least one of a thermal bubble ink-jet device and a piezoelectric ink-jet device. Surface tension and cohesion force of the protrusions 14 makes the ink adhere to the protrusions 14. Ink on the protrusions 14 can be solidified using at least one of a vacuum-pumping device, a heating device, and a light source to form ink layers 15 (i.e., ink on each protrusion 14 is solidified into one thin film, and the thin films form the ink layers 15). The light source can be an ultraviolet light source. The substrate 10 and the ink-jet device move relative to each other until each of the protrusions 14 is coated with a thin film.

To form multiple layers of ink layers 15 on the substrate 10, the step shown in FIG. 8 and the solidifying method need only be repeated a desired number of times.

Referring to FIG. 1, an optional step is performed to form a protective layer 18 on the black matrix 12 and the ink layers 15. The protective layer 18 is partly received between the sidewalls 143 of adjacent protrusions 14 and cover on the black matrix 12. The protective layer 18 can give the substrate structure 20 good oxidation resistance, moisture resistance, as well as making it much smoother.

In a third embodiment, a method for manufacturing a substrate structure includes the steps of: providing a substrate having a plurality of integral protrusions; depositing ink onto the integral protrusions; and solidifying the ink to form a plurality of ink layers on the respective protrusions.

Figure 9:
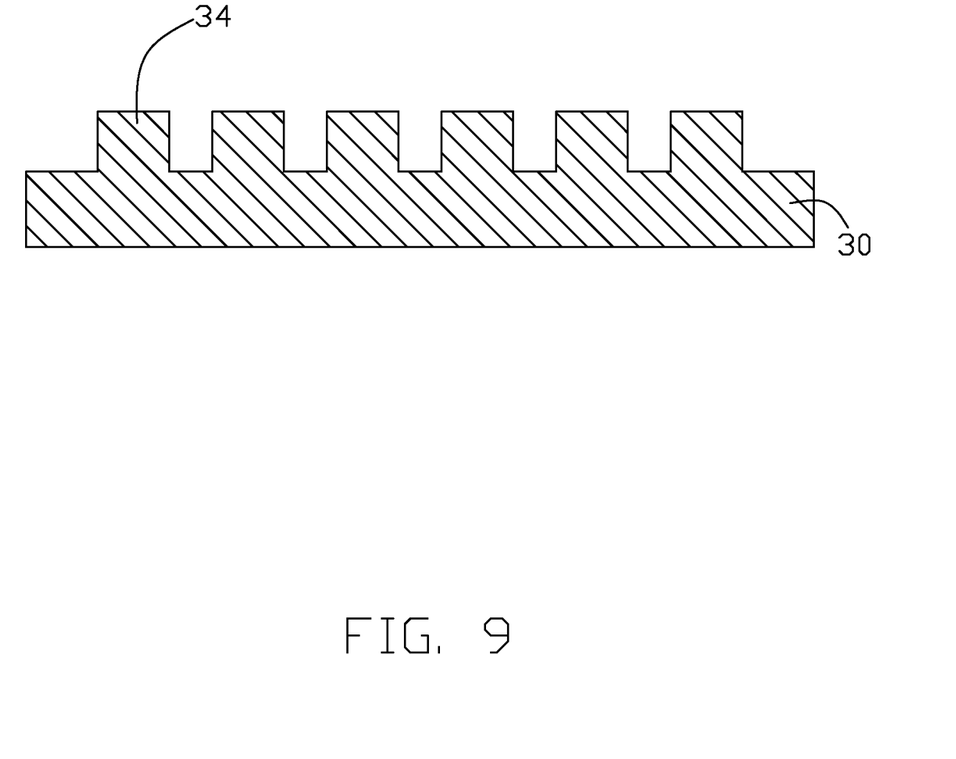
FIG. 9 is a schematic, cross-section view of a substrate in accordance with a third embodiment of the present substrate structure.

Referring to FIG. 9, a substrate 30 in accordance with the third embodiment is shown. The substrate 30 has a plurality of separate integral protrusions 34 formed integrally with the substrate 30.

In a fourth embodiment, a method for manufacturing a substrate structure includes the steps of: providing a substrate having a plurality of integral protrusions; depositing ink onto the protrusions; solidifying the ink to form a plurality of ink layers on the respective protrusions; and forming filling material between the protrusions. The filling material can be applied using an ink-jet device.

The method for manufacturing substrate structure can manufacture a color filter having a plurality of red layers, a plurality of blue layers, and a plurality of green layers, or an organic light-emitting diode having an electron transport layer, hole injection layer, and lighting layer. During the manufacturing of the color filter, the red layer, the blue layer, and the green layer can be made using this method. In the manufacturing of the organic light-emitting diode, the unit set forth can be made using this method.

Although the present substrate structure has been described with reference to specific embodiments, it should be noted that the described embodiments are not necessarily exclusive, and that various changes and modifications may be made to the described embodiments without departing from the scope of the invention as defined by the appended claims.

What is claimed is:

1. A substrate structure, comprising:
   a substrate;
   a black matrix comprising a plurality of banks formed on the substrate, the black matrix defining a plurality of isolated spaces and the plurality of isolated spaces being defined by the plurality of banks and the substrate; and
   a plurality of isolated transparent protrusions wholly and directly arranged on the substrate, each of the isolated transparent protrusions being positioned and fully filling each of the isolated spaces, each of the isolated transparent protrusion comprising a top surface and a side surface, the side surfaces of adjacent isolated transparent protrusions being spaced, each protrusion having a greater thickness than a thickness of the black matrix, thus the top surfaces of adjacent isolated transparent protrusions being spaced, wherein the thickness is measured normal to the substrate, and an ink layer is formed only on a whole top surface of each protrusion, so that a pattern formed by the ink layer is same as a pattern formed by the plurality of isolated transparent protrusions.

2. The substrate structure as claimed in claim 1, further comprising a protective layer covering the ink layers and the black matrix.

3. The substrate structure as claimed in claim 1, wherein the protrusions are formed integrally with the substrate.

4. The substrate structure as claimed in claim 1, wherein the ink layers comprises red layers, green layers, and blue layers arranged.

5. A color filter, comprising:
a substrate;
a black matrix formed on the substrate, the black matrix defining a plurality of isolated spaces; and
a plurality of isolated transparent protrusions wholly and directly arranged on the substrate, each of the isolated transparent protrusions being positioned and fully filling each of the isolated spaces, each of the isolated transparent protrusion comprising a top surface and a side surface, the side surfaces of adjacent isolated transparent protrusions being spaced, each protrusion having a greater thickness than a thickness of the black matrix, thus the top surfaces of adjacent isolated transparent protrusions being spaced, wherein the thickness is measured normal to the substrate, and an ink layer is formed only on a whole top surface of each protrusion, so that a pattern formed by the ink layer is same as a pattern formed by the plurality of isolated transparent protrusions.

6. The color filter as claimed in claim 5, wherein the black matrix comprises a plurality of banks formed on the substrate, the plurality of isolated spaces are defined by the plurality of banks and the substrate.

7. The color filter as claimed in claim 5, further comprising a protective layer covering the ink layers and the black matrix.

8. The color filter as claimed in claim 5, wherein the protrusions are formed integrally with the substrate.

9. The color filter as claimed in claim 5, wherein the ink layers comprise red layers, green layers, and blue layers arranged.

10. The color filter as claimed in claim 7, wherein the protective layer is partly received between the sidewalls of adjacent isolated transparent protrusions and cover on the black matrix.

11. A color filter, comprising:
a substrate;
a black matrix formed on the substrate, the black matrix defining a plurality of isolated spaces;
a plurality of isolated transparent protrusions wholly and directly arranged on the substrate, each of the isolated transparent protrusions fully filling each of the isolated spaces, each of the isolated transparent protrusion comprising a top surface and a side surface, the side surfaces of adjacent isolated transparent protrusions being spaced, each protrusion having a greater thickness than a thickness of the black matrix, wherein the thickness is measured normal to the substrate, thus the top surfaces of adjacent isolated transparent protrusions being spaced; and
an ink layer formed only on a whole top surface of each protrusion, so that a pattern formed by the ink layer is same as a pattern formed by the plurality of isolated transparent protrusions.

12. The color filter as claimed in claim 11, wherein the black matrix comprises a plurality of banks formed on the substrate, the plurality of isolated spaces are defined by the plurality of banks and the substrate.

13. The color filter as claimed in claim 11, further comprising a protective layer covering the ink layers and the black matrix.

14. The color filter as claimed in claim 13, wherein the protective layer is partly received between the sidewalls of adjacent isolated transparent protrusions and cover on the black matrix.

15. The color filter as claimed in claim 11, wherein the isolated transparent protrusions are formed integrally with the substrate using injection molding.

16. The color filter as claimed in claim 11, wherein the ink layers comprise red layers, green layers, and blue layers arranged.

* * * * *